(12) United States Patent
Gustafson et al.

(10) Patent No.: US 6,208,486 B1
(45) Date of Patent: Mar. 27, 2001

(54) SPINDLE MOTOR FLANGE LAND PORTION

(75) Inventors: John R. Gustafson, Los Gatos; Payman Hassibi; Kamran Oveyssi, both of San Jose, all of CA (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 09/312,310

(22) Filed: May 14, 1999

(51) Int. Cl.$^7$ ................................. G11B 17/038; G11B 25/04
(52) U.S. Cl. .................................... 360/98.08; 360/99.12
(58) Field of Search ............................ 360/98.08, 99.12

(56) References Cited

U.S. PATENT DOCUMENTS

| | | | |
|---|---|---|---|
| 4,672,488 | * 6/1987 | Wright | 360/98.08 |
| 4,754,351 | 6/1988 | Wright . | |
| 4,910,620 | * 3/1990 | Olbrich | 360/98.08 |
| 5,031,061 | * 7/1991 | Hatch | 360/98.07 |
| 5,089,922 | * 2/1992 | LeClair | 360/99.08 |
| 5,267,106 | * 11/1993 | Brue et al. | 360/98.08 |
| 5,315,463 | 5/1994 | Dew et al. . | |
| 5,334,896 | 8/1994 | Ohsawa . | |
| 5,457,589 | * 10/1995 | Leuthold et al. | 360/99.12 |
| 5,485,331 | 1/1996 | Dunfield et al. . | |
| 5,490,022 | * 2/1996 | Hoshina et al. | 360/98.08 |
| 5,781,374 | * 7/1998 | Moir et al. | 360/99.12 |

FOREIGN PATENT DOCUMENTS

| | | |
|---|---|---|
| 1-264679 | * 10/1989 | (JP) . |
| 4-184758 | * 7/1992 | (JP) . |
| 4-186577 | * 7/1992 | (JP) . |
| 4-337558 | * 11/1992 | (JP) . |

* cited by examiner

*Primary Examiner*—William Klimowicz
(74) *Attorney, Agent, or Firm*—Milad G Shara; W Chris Kim

(57) ABSTRACT

A disk drive includes a disk drive base, a spindle motor, a first disk and a disk clamp. The rotary hub of the spindle motor includes a generally cylindrically-shaped hub wall and a hub flange including an inner annular surface adjacent to the hub wall, an outer annular surface and a flange land portion integrally formed with the hub flange. The land portion is positioned between the annular surfaces and defines a disk contact surface projecting above the annular surfaces, the disk contact surface being substantially centered on the hub flange. The first disk is supported by the disk contact surface to form a clearance between the annular surfaces and the first disk. A second disk may be coupled to the spindle motor and an annular disk spacer may be positioned between the disks. The annular disk spacer includes a first spacer surface facing the first disk and a second spacer surface facing the second disk. The first and second spacer surfaces each comprise an inner annular spacer surface adjacent to the hub wall, an outer annular spacer and a spacer land portion integrally formed with the spacer and positioned between the annular spacer surfaces to define a spacer-to-disk contact surface that projects from the annular spacer surfaces to form a clearance between a respective disk and respective annular surfaces. The disk clamp for applies a clamping force to the first and second disks that is substantially centered on each spacer-to-disk contact surface and on the disk contact surface.

13 Claims, 5 Drawing Sheets

SPINDLE MOTOR FLANGE LAND PORTION

BACKGROUND OF THE INVENTION

1. Field of the Invention

The present invention relates to a disk drive and to a spindle motor for a disk drive. More particularly, the present invention relates to a magnetic hard disk drive ("HDD") having a spindle motor having an integral flange land portion for reducing the effects of temperature-related differential expansions between the constituent elements of the spindle motor.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a read/write head for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A "rotary" or "swing-type" actuator assembly comprises a body portion that rotates on a pivot bearing cartridge between limited positions, a coil portion that extends from one side of the body portion to interact with one or more permanent magnets to form a voice coil motor, and an actuator arm that extends from an opposite side of the body portion to support the HGA.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the head(s). The transfer rate of the data signals is a function of rotational speed of the spindle motor; the faster the rotational speed, the higher the transfer rate. The density of the information stored on a disk is a function, among other factors, of the number of Tracks Per Inch (TPI) on the disk. The higher the TPI, the higher the storage density, all other factors being equal. To increase disk storage capacity and transfer rate, disk drive designers have found it expedient to increase both TPI and disk rotational speeds. However, increased TPI and disk rotational speeds render the correct and dependable positioning of the heads over the disk an increasingly delicate matter. Head positioning errors (as measured by a signal called the Position Error Signal (PES) or some equivalent signal) are a primary concern in the design and manufacture of disk drives.

Moreover, the frequency and severity of these head positioning errors are exacerbated by fluctuations in temperature. Indeed, whereas the hub flange supporting the disks on the spindle motor and the disks themselves may be formed of or include aluminum, the yoke supporting the spindle motor magnet is typically made of a magnetic material, such as steel. Dissimilar materials typically have different thermal coefficients of expansion. As the temperature of the drive changes, these different thermal expansion coefficients cause the hub, the disks (and the disk spacers) and the yoke to expand and contract at different rates, causing the disks to undergo undesired radial shifts, resulting in an increased incidence of head positioning errors.

The disks of magnetic disk drives, despite the most exacting manufacturing specifications, typically vary in their "roundness" and in their thickness. When such disks are secured to the spindle motor of the drive, these slight variations in roundness and thickness, for example, cause the disk to deform somewhat, assuming a smoothly varying topography that is sometimes likened to that of a potato chip. Radial shifts, caused by temperature cycling, can change the shape of this potato chip pattern. Because of such radial shifts, the read write heads of the disk may experience difficulties in staying "on track," resulting in increased head positioning errors. The disk drive industry, therefore, has been challenged to overcome such head positioning problems occasioned by, among other factors, temperature cycling-induced radial disk shifts.

Various attempts have been made to address the problems caused by temperature fluctuations in a disk drive. In U.S. Pat. No. 5,334,896, the disk is clamped between the spindle motor hub flange and a disk clamp. The material of the flange is matched to the material of the disk. The disk, in this reference, is described as being supported by a seat on the spindle motor hub flange, the seat apparently extending about two third of the width of the hub flange to the outer-most edge thereof. A separate rotor yoke made of magnetic material is fitted to the hub and the yoke covers the top and the outer circumference of the stator. However, the different thermal expansion coefficients of the large yoke and of the hub, combined with the large contact surface area between the seat and the disk, may cause undesirable radial shifts and mechanical distortion in the disk as the temperature in the disk drive changes. In a further attempt to address the above-described different thermal expansion coefficients, U.S. Pat. No. 5,315,463 proposes to add a separate expansion ring and a separate polyethylene terephthalate washer between the steel hub flange and the lower-most disk of the drive. The expansion ring includes a ridge aligned with the outer diameter of the hub flange. However, because the material of the expansion ring expands at a faster rate than the rate at which the steel flange expands, the polyethylene washer disclosed therein must be interposed between the expansion ring and the steel flange, to allow the expansion ring to move freely in the radial direction with respect to the hub flange. This scheme, however, requires the addition of at least two additional and distinct parts, thereby increasing both design complexity and manufacturing costs.

What are needed, therefore, are spindle motors and disk drives that are simple to manufacture, relatively insensitive to temperature fluctuations, less costly and more effective in suppressing radial shifts or slippage than existing solutions.

SUMMARY OF THE INVENTION

The present invention can be regarded as a spindle motor for a disk drive having a disk, the spindle motor comprising a motor base, a shaft coupled to the motor base and a rotary hub surrounding the shaft. The rotary hub comprises a generally cylindrically-shaped hub wall and a hub flange for supporting the disk. The hub flange comprises an inner annular surface adjacent to the hub wall, an outer annular surface spaced-apart radially from the inner annular surface and a flange land portion integrally formed with the hub flange, the land portion being positioned between the annular surfaces and defining a disk contact surface for contacting the disk. The disk contact surface projects above the annular surfaces and is substantially centered on the hub flange.

The radial distance between the hub wall and an outer-most edge of the outer annular surface defines a hub flange width. The width of the land portion is preferably about 5 to about 50 percent of the hub flange width. The disk contact surface may extend between a flange land inner edge surface adjacent the inner annular surface and a flange land outer edge surface adjacent the outer annular surface, the flange land inner and outer edge surfaces being substantially parallel to the hub wall. Alternatively, the flange land inner and outer edge surfaces each may form an obtuse angle (i.e., an angle greater than 90 degrees) relative to a plane parallel to the inner and outer annular surfaces. Alternatively still, the disk contact surface of the land portion may extend between a curved flange land inner edge surface adjacent the inner annular surface and a curved flange land outer edge surface adjacent the outer annular surface.

The present invention can also be regarded as a disk drive comprising a disk drive base, a spindle motor attached to the disk drive base, the spindle motor comprising a motor base, a shaft coupled to the motor base and a rotary hub surrounding the shaft. The rotary hub comprises a generally cylindrically-shaped hub wall, a hub flange comprising an inner annular surface adjacent to the hub wall, an outer annular surface spaced-apart radially from the inner annular surface and a flange land portion integrally formed with the hub flange. The land portion is positioned between the annular surfaces and defines a disk contact surface that projects above the annular surfaces, the disk contact surface being substantially centered on the hub flange. A first disk is supported by the disk contact surface to form a clearance between the annular surfaces and the first disk. A disk clamp applies a clamping force to the first disk, the clamping force being substantially centered on the disk contact surface.

The disk contact surface may be substantially flat. The radial distance between the hub wall and an outer-most edge of the outer annular surface defines a hub flange width and the width of the land portion may be less than about 50% of the hub flange width. The disk contact surface of the land portion extends between a flange land inner edge surface adjacent the inner annular surface and a flange land outer edge surface adjacent the outer annular surface. The flange land inner and outer edge surfaces may be substantially parallel to the hub wall or may each form an obtuse angle relative to a plane parallel to the inner and outer annular surfaces. Alternatively, the disk contact surface of the land portion may extend between a curved flange land inner edge surface adjacent the inner annular surface and a curved flange land outer edge surface adjacent the outer annular surface. The integral flange land portion may be configured to induce a local deformation in the first disk under the applied clamping force.

The disk drive may further comprise a second disk, an annular disk spacer to separate the first disk from the second disk and a disk clamp for applying a clamping force to the first and second disks. The disk spacer comprises a first spacer surface facing the first disk, a second spacer surface spaced-apart from the first spacer surface and facing the second disk, the first and second spacer surfaces each comprising an inner annular spacer surface adjacent to the hub wall, an outer annular spacer surface spaced-apart radially from the inner annular spacer surface and a spacer land portion integrally formed with the disk spacer. The spacer land portion is positioned between the annular spacer surfaces and defines a spacer-to-disk contact surface, the spacer-to-disk contact surface being substantially centered on the disk contact surface and projecting from the annular spacer surfaces to form a clearance between a respective disk and respective annular spacer surfaces. The clamping force is substantially centered on each spacer-to-disk contact surface.

The spacer land portion of the first spacer surface and the spacer land portion of the second spacer surface may be configured to induce a local deformation in the first and second disks, respectively, under the applied clamping force. The integral spacer land portion of each of the first and second spacer surfaces may comprise a substantially flat land portion.

DESCRIPTION OF THE PREFERRED EMBODIMENTS

Figure 1:
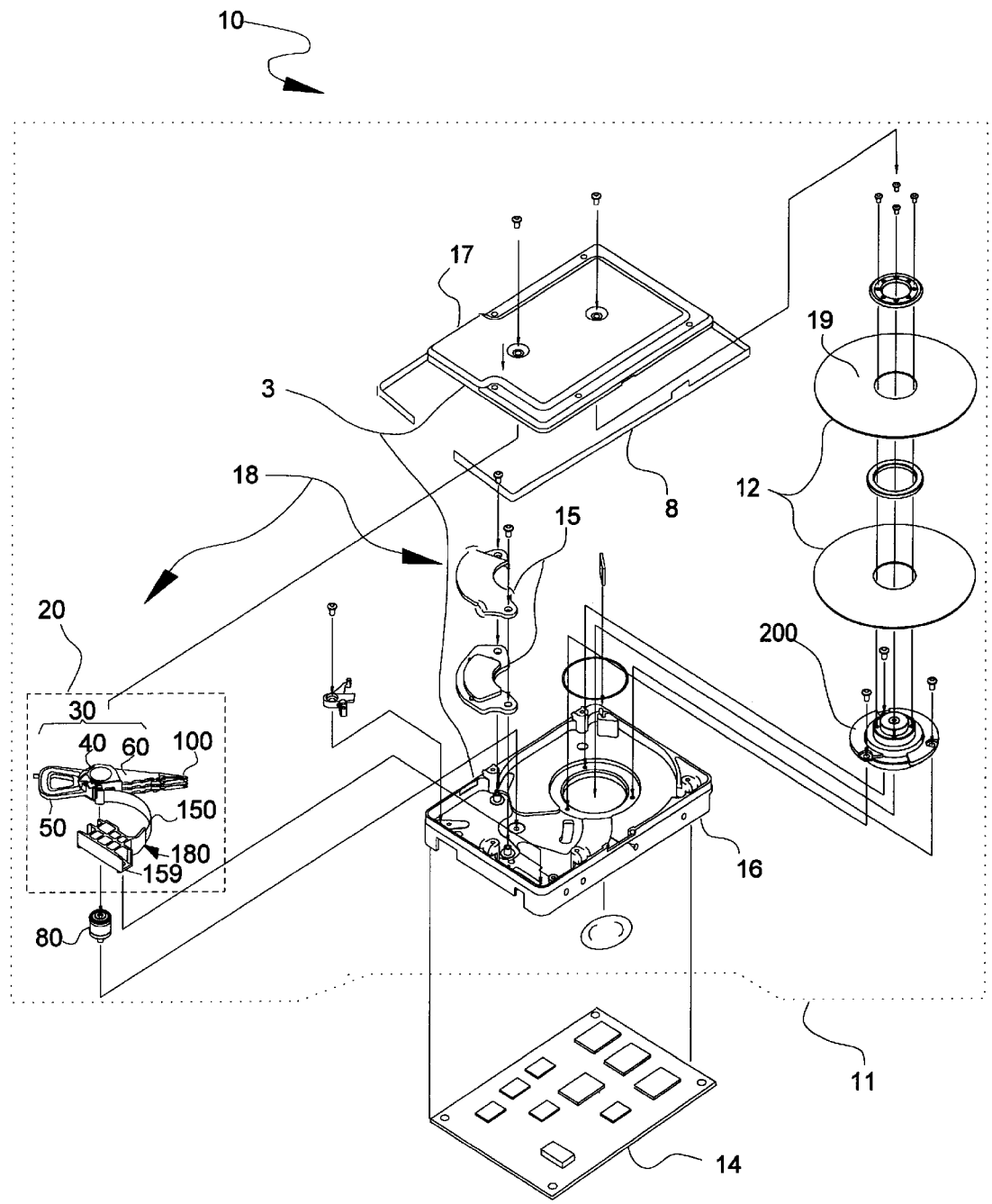
FIG. 1 is an exploded perspective view of a magnetic hard disk drive including a spindle motor, according to an embodiment of the present invention.

FIG. 1 shows the principal components of a disk drive such as a magnetic hard disk drive 10 constructed in accordance with the present invention. With reference to FIG. 1, the disk drive 10 includes an HDA 11 and a PCBA 14.

The HDA 11 includes a disk drive base 16 and a cover 17 attached to the base 16 that collectively define an enclosure 3 which houses a magnetic disk 12 (two shown), a spindle motor 200 attached to the HDA base 16 for rotating the mounted disk 12, a head stack assembly 20, a pivot bearing cartridge 80, such as a stainless steel pivot bearing cartridge, that rotatably supports the HSA 20 on the HDA base 16, and a pair of magnet plates 15, at least one of the plates 15 having a permanent magnet attached to the plate. The plates 15, head stack assembly 20, and pivot bearing cartridge 80 form a rotary actuator arrangement generally denoted by 18. Suitably, a tape seal 8 or a gasket seal (not shown) is used to seal the enclosure such that the interior of the HDA is substantially free of contaminants. The spindle motor 200 preferably rotates the disk 12 at a constant angular velocity. The preferred head stack assembly 20 comprises a swing-type or rotary actuator assembly 30, at least one head gimbal assembly 100, and a flex circuit cable assembly 180. The rotary actuator assembly 30 includes a body portion 40, at least one actuator arm 60 cantilevered from the body portion 40, and a coil portion 50 cantilevered from the body portion 40 in an opposite direction from the actuator arm 60. The actuator arm 60 supports the head gimbal assembly 100 with a head located at its far end that is biased toward and moveable over the disk 12. The flex cable assembly 180 includes a flex circuit cable 150 and a flex clamp 159. The head stack assembly 20 is pivotally secured to the HDA base 16 via the pivot bearing cartridge 80 so that the head at the distal end of the head gimbal assembly 100 may be moved over a recording surface 19 of the disk 12. The storage capacity of the HDA 11 may be increased, as shown in FIG. 1, by including several disks 12 and a head stack assembly 20 having a vertical "stack" of head gimbal assemblies 100 supported by multiple actuator arms 60.

Figure 2:
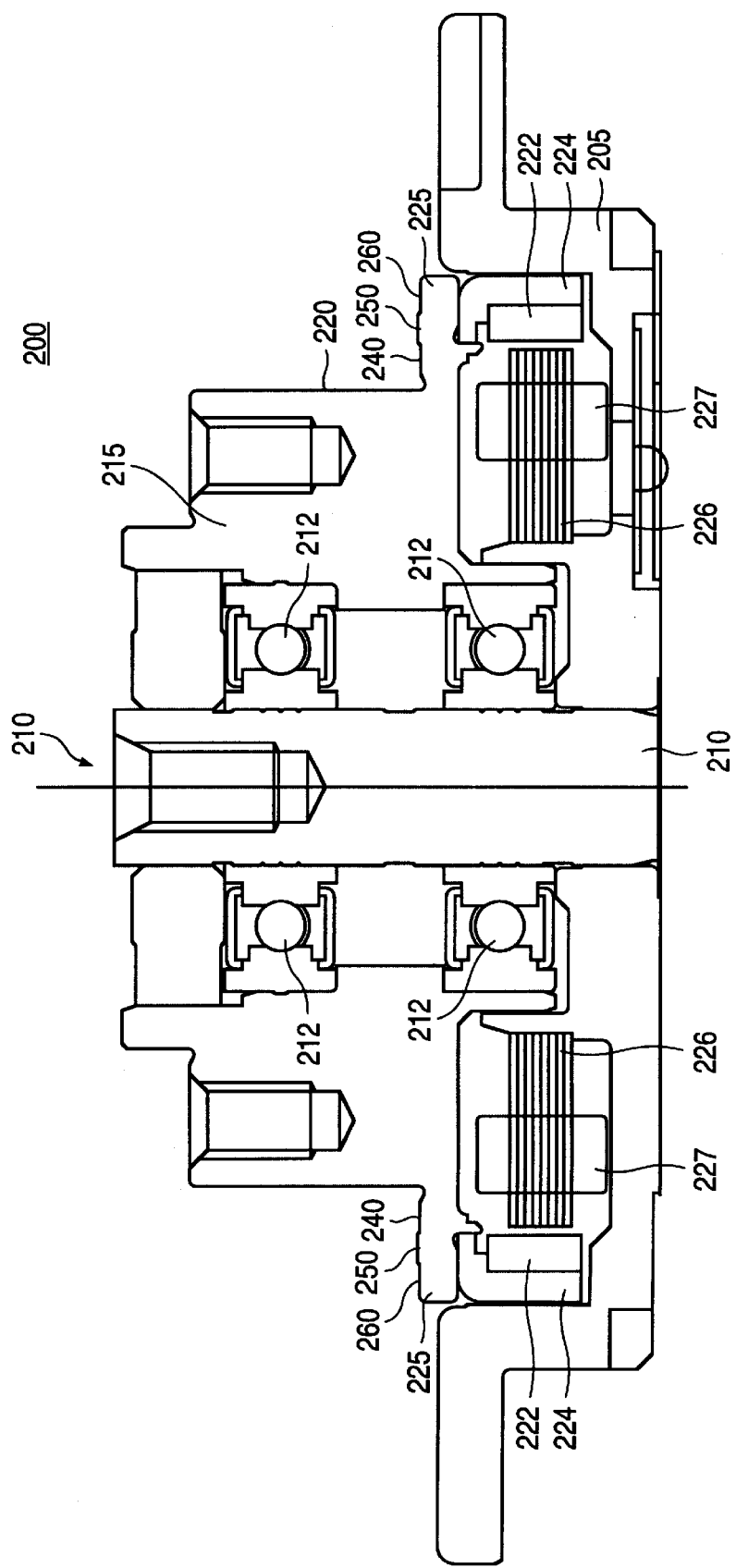
FIG. 2 is a cross-sectional view of the spindle motor of FIG. 1.

FIG. 2 shows a cross section of a spindle motor 200 according to an embodiment of the present invention. The spindle motor 200 of FIG. 2 includes a motor base 205 that may be coupled to the HDA base 16 shown in FIG. 1. A shaft 210 is coupled to the motor base 205 and a rotary hub 215 surrounds the shaft 210. The rotary hub 215 includes a generally cylindrically-shaped hub wall 220 and a hub flange 225 to support a disk or disks, such as shown at reference numeral 12 in FIG. 1. In operation of the spindle motor 200, the hub 215 rotates about the shaft 210 on bearings 212. A permanent magnet ring 222 is attached to the hub 215 by a yoke 224 made of, for example, steel. A stator 226 is positioned co-axially around the shaft 210 and a stator winding 227 is wound on stator 226; preferably, a plurality of stator windings 227 are wound on the stator 226 in a multi-phase spindle motor.

According to an embodiment of the present invention, the hub flange 225 includes an inner annular surface 240 adjacent to the hub wall 220 and an outer annular surface 260 spaced-apart radially from the inner annular surface 240. Each annular surface 240, 260 includes an inner diameter and an outer diameter. A flange land portion 250 is integrally formed with (e.g., machined from the material of the) the hub flange 225, the flange land portion 250 being positioned between the inner annular surface 240 and the outer annular surface 260. The flange land portion 250 defines a disk contact surface 258 (see FIG. 3) for contacting the lowermost disk 230, the disk contact surface 258 projecting above the annular surfaces 240, 260.

Figure 3:
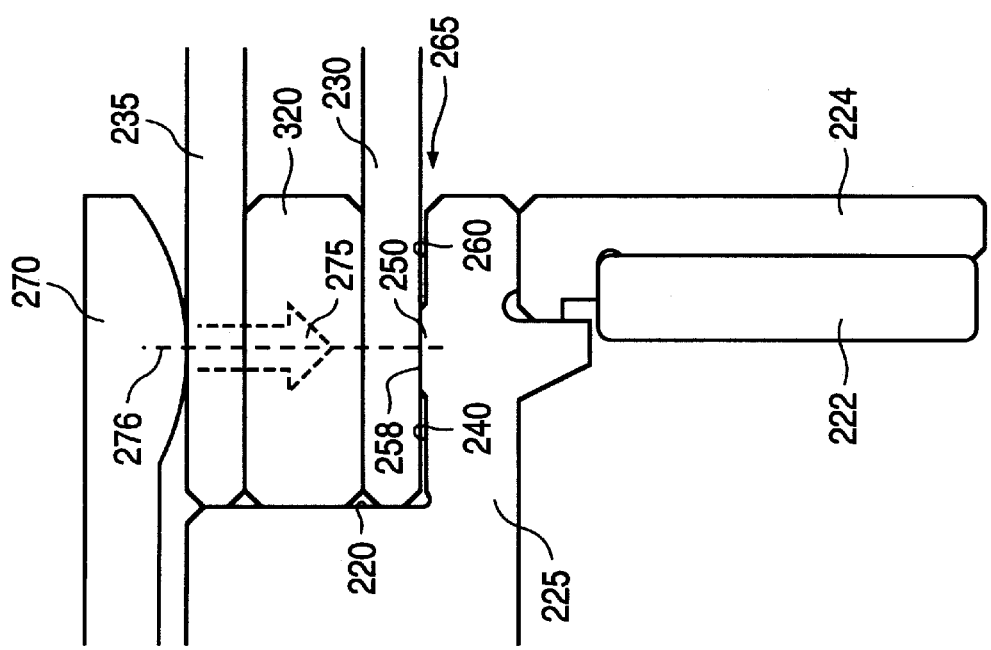
FIG. 3 is a partial side view of the spindle motor shown in FIG. 2, shown with two disks separated by a disk spacer, to illustrate an embodiment of the present invention.

FIG. 3 is a partial side view of the spindle motor 200 shown in FIG. 2. According to an embodiment of the present invention, a first (lowermost) disk 230 and a second disk 235 are separated by a disk spacer 320. It is understood, however, that the present invention is not limited to the configuration wherein two disks 230, 235 are clamped onto the spindle motor 200. Indeed, a lesser or greater number of disks may be rotatably mounted onto the spindle motor 200. As shown in FIG. 3, a disk clamp 270 applies a clamping force 275 (symbolized in FIG. 3 as the arrow in dashed lines) to the first disk 230, the clamping force 275 being substantially centered on the disk contact surface 258; in this instance, the phrase "substantially centered" includes the preferred embodiment in which clamping force 275 is centered on disk contact surface 258 and alternative embodiments in which clamping force 275 is within about +/−0.25 mm from the center of disk contact surface 258. More generally, in such alternative embodiments, the radial distance of clamping force 275 relative to the center of disk contact area 258 is on the order of about +/− twenty five percent of the width of disk contact surface 258.

Continuing with FIG. 3, dashed line 276 represents the center of the radial width of hub flange 225 in which the radial width is generally defined as extending from the inner diameter of annular surface 240 to the outer diameter of annular surface 260. Suitably, the radial width of hub flange 225 is 4 mm. The disk contact surface 258 is substantially centered on the hub flange 225; the phrase "substantially centered" includes the preferred embodiment in which disk contact surface 258 is centered on hub flange 225 (i.e., the center of disk contact surface 258 coincides with dashed line 276 as shown in FIG. 3) and alternative embodiments in which the center of disk contact surface 258 is radially offset from the center of the hub flange 225; in such alternative embodiments, the center of disk contact surface 258 is radially offset from the center of hub flange 225 within a range of about +/−25 percent of the width of disk contact surface 258. For example, if the width of disk contact surface 258 is 1 mm, then the center of disk contact surface 258 may be within a range of about +/−0.25 mm from the center of hub flange 225. Preferably, the height of flange land portion 250 is between 0.004 to 0.008 inches, and even more preferably, 0.004 inches. As shown in FIG. 3, the first disk 230 is supported by the disk contact surface 258 to form clearances 265 between the annular surfaces 240, 260 and the first disk 230.

The presence of the flange land portion 250, therefore, reduces the contact area of the first disk 230 with the hub flange 225. For a given clamping force 275, therefore, reducing the contact area of the first disk 230 with the hub flange 225 increases the pressure (unit of force per unit of area) between the disk contact surface 258 and the first disk 230. According to the present invention, the flange land portion 250, under the applied clamping force 275, induces a local deformation in the first disk 230. The clamping force 275, therefore, should be of a magnitude that is sufficient to induce such a local deformation in the first disk 230, but should not be of such a magnitude as to damage the first disk 230 or, indeed, the second disk 235 or any other disk rotatably secured to the spindle motor 200. Preferably, the magnitude of clamping force 275 is between 200 to 300 lbs and even more preferably, 250 lbs. The magnitude of the clamping force 275, and hence the pressure, necessary to form such local deformation in the first disk 230 varies directly with the width of the disk contact surface 258, among other factors such as the disk material. Indeed, the greater the radial width (width as measured in the radial direction) of the disk contact surface 258, the greater the clamping force 275 is necessary to induce the local deformation in the first disk 230. Conversely, the smaller the radial width of the disk contact surface 258, the smaller the clamping force 275 is required to induce the local deformation. According to the present invention, the local deformation of the first disk 230 caused by the reduced area of the disk contact surface 258 greatly reduces the radial shift of the first and second disks 230, 235 (and any other disks—not shown—coupled to the spindle motor 200) when the drive is subjected to fluctuations in temperature.

The applied clamping force 275 is, in practice, somewhat unevenly applied over the contact surface between the second disk 235 (or the upper-most disk of the drive) and the disk clamp 270, despite the most exacting design standards. The unevenness of the applied clamping force 275 may be caused by a non-uniform thickness of the disks 230, 235, an unevenness of the disk contact surface of the disk clamp 270, an imperfectly flat hub flange 225 and/or any non-uniformity of the torque applied to the fasteners with which the disk clamp 270 is secured to the rotary hub 215, among other possible factors. The unevenness of the applied clamping force 275, whatever its profile and underlying cause, creates a moment that causes a torque on the ii disks 230, 235. This torque, in turn, may cause further radial slippage of the disks 230, 235, relative to the hub wall 220. The flange land portion 250 of the hub flange 225 concentrates the applied clamping force 275 on the disk contact surface 258, meaning that clamping force 275 is applied over a smaller area (i.e., the disk contact surface 258) than would otherwise be the case in the absence of the flange land portion 250. This concentrated force reduces the moment and thus the torque acting upon the disks 230, 235 and thus further reduces the tendency of the disks 230, 235 to radially slip relative to the hub wall 220, particularly under the influence of variations in temperature.

The width of disk contact surface 258, according to the present invention, may be defined in terms of the radial width of the hub flange 225. For example, as noted above, the distance between the inner diameter of annular surface 240 and the outer diameter of annular surface 260 of the flange 225 may be defined as the width of the hub flange 225. In that case, the radial width of the disk contact surface 258 may be selected between about 5 to about 50 percent of the hub flange width. Preferably, the radial width of the disk contact surface 258 may be selected between about 15 and 35 percent of the width of the hub flange 225. For example, the radial width of the disk contact surface 258 may be about 25 percent of the width of the hub flange 225, such as about 1 millimeter in width for a hub flange about 4 millimeters in width as mentioned above.

Figure 5:
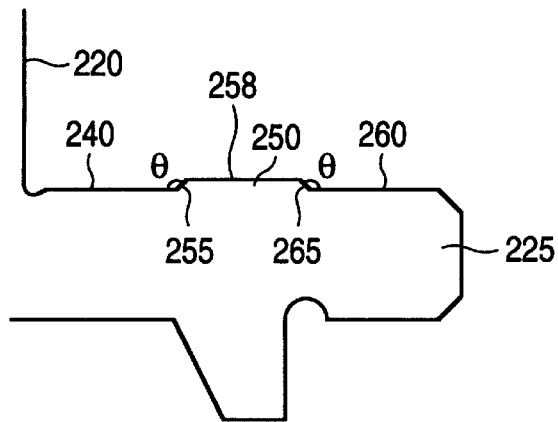
FIG. 5 is a side view of the spindle motor hub flange shown in FIG. 2, according to a further embodiment of the present invention.
Figure 6:
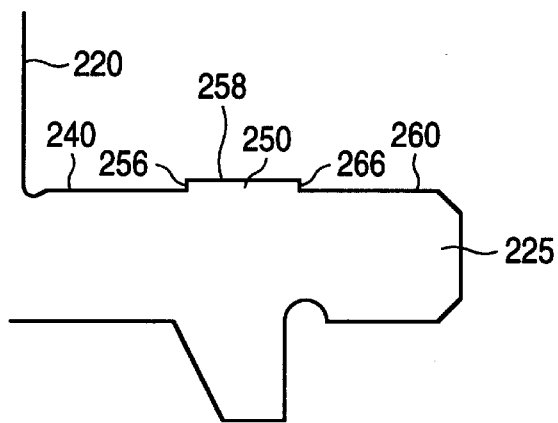
FIG. 6 is a side view of the spindle motor hub flange shown in FIG. 2, according to a still further embodiment of the present invention.
Figure 7:
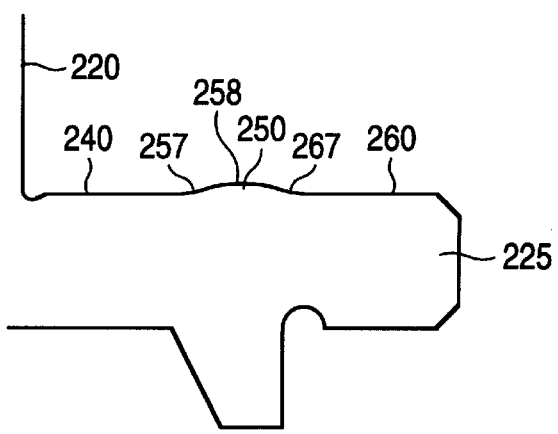
FIG. 7 is a side view of the spindle motor hub flange shown in FIG. 2, according to another embodiment of the present invention.

The flange land portion 250, according to the present invention, may assume a number of configurations, as shown in FIGS. 5–7. Turning first to FIG. 5, the disk contact surface 258 extends between a flange land inner edge surface 255 adjacent the inner annular surface 240 and a flange land outer edge surface 265 adjacent the outer annular surface 260, the flange land inner and outer edge surfaces 255, 265 each forming an obtuse angle Θ relative to a plane parallel to the inner and outer annular surfaces 240, 260. Alternatively, the flange land inner edge surface 256 adjacent the inner annular surface 240 and the flange land outer edge surface 266 adjacent the outer annular surface 260 may be substantially parallel to the hub wall 220, as shown in FIG. 6. Alternatively still, as shown in FIG. 7, the disk contact surface 258 of the flange land portion 250 may extend between a (smoothly) curved flange land inner edge surface 257 adjacent the inner annular surface 240 and a (smoothly) curved flange land outer edge surface 267 adjacent the outer annular surface 260. In a preferred embodiment, the disk contact surface 258 is flat and in an alternative embodiment, the disk contact surface 258 may be curved, to approximate a "line contact" between the first disk 230 and the hub flange 225. Combinations and/or variations on the configuration and/or dimensions of the flange land portion 250 are possible and all such combinations and/or variations should be deemed to fall within the scope of the present invention. To achieve the full benefits of the present invention, however, the clamping force 275 of the disk clamp 270 should be centered on the disk contact surface 258 of the flange land portion 250, whatever its configuration and/or position on the hub flange 225.

Figure 4B:
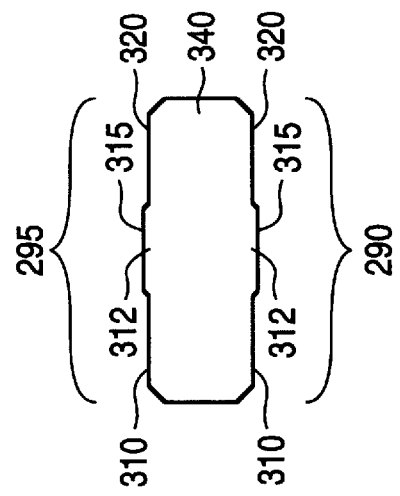
FIG. 4B is a side view of a disk spacer according to an embodiment of the present invention.
Figure 4A:
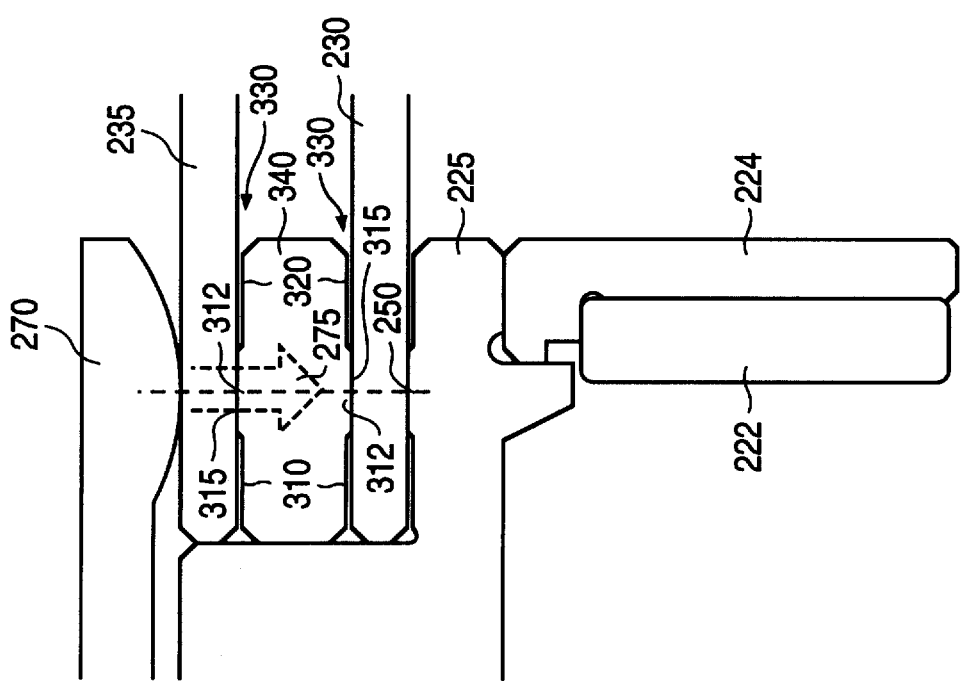
FIG. 4A is a partial side view of the spindle motor shown in FIG. 2, shown with two disks separated by a disk spacer according to the present invention, to illustrate another embodiment thereof.

As shown particularly in FIGS. 4A and 4B, the disk drive according to the present invention may also include an annular disk spacer 340 positioned between the first disk 230 and the second disk 235. The annular disk spacer 340, according to an embodiment of the present invention, includes a first spacer surface 290 facing the first disk 230 and a second spacer surface 295 spaced-apart from the first spacer surface 290 and facing the second disk 235. In turn, the first and second spacer surfaces 290, 295 each include an inner annular spacer surface 310 positioned adjacent to the hub wall 220 and an outer annular spacer surface 320 spaced-apart radially from the inner annular spacer surface 310. A spacer land portion 312 is integrally formed with (e.g., machined from the material of) the disk spacer 340, the spacer land portion 312 being disposed between the annular spacer surfaces 310, 320 and defining a spacer-to-disk contact surfaces 315 that project from the annular spacer surfaces 310, 320 to form clearances 330 between the facing disk 230, 235 and the annular spacer surfaces 310, 320. The disk clamp 270, as shown in FIG. 4A, applies a clamping force 275 to the first and second disks 230, 235, the clamping force 275 being substantially centered on each spacer-to-disk contact surface 315 and the disk contact surface 258 of the hub flange 225; in this instance, the phrase "substantially centered" includes the preferred embodiment in which clamping force 275 is centered on each spacer-to-disk contact surface 315 and the disk contact surface 258 and alternative embodiments in which clamping force 275 is within about +/−0.25 mm from the center of each spacer-to-disk contact surface 315 and the center of disk contact surface 258. More generally, in such alternative embodiments, the radial distance of clamping force 275 relative to the center of each spacer-to-disk contact surface 315 is on the order of +/− twenty five percent of the width of each spacer-to disk contact surface 315 and the radial distance of clamping force 275 relative to the center of the disk contact surface 258 is also on the order of +/− twenty five percent of the width of the disk contact surface 258.

Preferably, spacer-to-disk contact surfaces 315 and disk contact surface 258 have the same radial width and spacer-to-disk contact surfaces 315 are aligned with the disk contact surface 258 of the hub flange 225. Preferably, the spacers are made of a material having a similar coefficient of expansion as the disks 230, 235 and the hub flange 225 such as, for example, aluminum. Preferably, the clamping force 275 applied by the disk clamp 270 causes the flange land portion 250 and the spacer-to-disk contact surfaces 315 to locally deform the disks 230, 235. In this manner, the first disk 230 may undergo a local deformation on each side thereof, caused by the applied clamping force 275 acting on the reduced area of the flange land portion 250 on one side of the first disk 230 and acting on the spacer-to-disk contact surface 315 on the other side thereof. Similarly, the second disk 235 may undergo a local deformation (caused by the disk clamp 270) on the side of the disk 235 facing the disk clamp 270 and may also undergo a local deformation (caused by the spacer 340) on the side of the disk facing the spacer-to-disk contact surface 315 of the spacer 340. In this manner, the first disk 230 and the second disk 235 (and any other disk present therebetween) are locally deformed under the action of the clamping force 275 applied to the flange land portion 250 and applied to the substantially flat spacer-to-disk contact surfaces 315 of the spacer(s) 340.

Significantly, the flange land portion 250 and the spacer-to-disk contact surfaces 315 cause local deformation that "pinch" the disks 230, 235 without damaging them and prevent (or at least greatly reduce) radial slippage of the disks 230, 235. The flange land portion 250, according to the present invention, is preferably machined from hub flange material and is integral therewith. According to one embodiment of the present invention, the first and second disks 230, 235 and the hub flange 225 (and therefore the flange land portion 250) are formed of or include materials having similar coefficients of expansion. For example, the first and second disks 230, 235 and the hub flange 225 (and therefore the flange land portion 250) may be formed of aluminum. The present invention makes the shape of the disks 230, 235 substantially insensitive to distortions of the hub flange 225 caused by the differential expansion between, for example, the hub flange 225 and the magnet yoke 224 shown in FIG. 1. Attaching the magnet 222 to the yoke 224 (typically formed of steel) by staking is simple, fast and inexpensive, but can cause considerable distortion of the hub flange 225 over temperature. The flange land portion 250 of the hub flange 225 allows the magnet 222 to be attached to the steel yoke 224 by staking while avoiding the disadvantages normally associated therewith. The spacers 340 according to the present invention further contribute to mechanical stability of the disks 230, 235 over temperature. The flange land portion 250 and the spacer(s) 340, according to the present invention, render the shape of the disks 230, 235 very stable over temperature, thereby reducing further temperature-induced changes in the disks' "potato chip" shape described above. By providing disks with increased mechanical stability, the present invention allows higher TPIs and fewer off-track head positioning errors and higher data storage densities to be achieved.

We claim:

1. A disk drive comprising:

a disk drive base;

a spindle motor attached to the disk drive base, the spindle motor comprising:
  a motor base;
  a shaft coupled to the motor base;
  a rotary hub surrounding the shaft, the rotary hub comprising:
    a generally cylindrically-shaped hub wall;
    a hub flange comprising:
      an inner annular surface adjacent to the hub wall;
      an outer annular surface spaced-apart radially from the inner annular surface;
      a flange land portion integrally formed with the hub flange, the land portion positioned between the annular surfaces and defining a disk contact surface projecting above the annular surfaces, the disk contact surface being substantially centered on the hub flange;

a first disk supported by the disk contact surface to form a clearance between the annular surfaces and the first disk;

a disk clamp for applying a clamping force to the first disk, the clamping force being substantially centered on the disk contact surface;

a second disk; and an annular disk spacer to separate the first disk from the second disk, the disk spacer comprising:
  a first spacer surface facing the first disk,
  a second spacer surface spaced-apart from the first spacer surface and facing the second disk, the first and second spacer surfaces each comprising:
    an inner annular spacer surface adjacent to the hub wall;
    an outer annular spacer surface spaced-apart radially from the inner annular spacer surface;
    a spacer land portion integrally formed with the disk spacer, the spacer land portion positioned between the annular spacer surfaces and defining a spacer-to-disk contact surface, the spacer-to-disk contact surface being substantially centered relative to the disk contact surface and projecting from the annular spacer surfaces to form a clearance between a respective disk and respective annular spacer surfaces.

2. The disk drive of claim 1, wherein the disc contact surface is substantially flat.

3. The disk drive of claim 1, wherein a radial distance between the hub wall and an outermost edge of the outer annular surface defines a hub flange width and wherein a width of the land portion is less than about 50% of the hub flange width.

4. The disk drive of claim 1, wherein the disk contact surface of the land portion extends between a flange land inner edge surface adjacent the inner annular surface and a flange land outer edge surface adjacent the outer annular surface, the flange land inner and outer edge surfaces being substantially parallel to the hub wall.

5. The disk drive of claim 1, wherein the disk contact surface of the land portion extends between a flange land inner edge surface adjacent the inner annular surface and a flange land outer edge surface adjacent the outer annular surface, the flange land inner and outer edge surfaces each forming an obtuse angle relative to a plane parallel to the inner and outer annular surfaces.

6. The disk drive of claim 1, wherein the disk contact surface of the land portion extends between a curved flange land inner edge surface adjacent the inner annular surface and a curved flange land outer edge surface adjacent the outer annular surface.

7. The disk drive of claim 1, wherein the integral flange land portion is configured to induce a local deformation in the first disk under the applied clamping force.

8. The disk drive of claim 1, wherein the spacer land portion of the first spacer surface and the spacer land portion of the second spacer surface are configured to induce a local deformation in the first and second disks, respectively, under the applied clamping force.

9. The disk drive of claim 1, wherein the integral spacer land portion of each of the first and second spacer surfaces comprises a substantially flat land portion.

10. A disk drive comprising:

a disk drive base;

a spindle motor attached to the disk drive base and including a generally cylindrical hub wall;

a first and a second disk coupled to the spindle motor;

an annular disk spacer positioned between the first disk and the second disk, the disk spacer comprising:
  a first spacer surface facing the first disk;
  a second spacer surface spaced-apart from the first spacer surface and facing the second disk;
  the first and second spacer surfaces each comprising:
    an inner annular spacer surface adjacent to the hub wall;
    an outer annular spacer surface spaced-apart radially from the inner annular spacer surface;
    a spacer land portion integrally formed with the disk spacer, the spacer land portion positioned between the annular spacer surfaces and defining a spacer-to-disk contact surface that projects from the annular spacer surfaces to form a clearance between a respective disk and respective annular spacer surfaces; and a disk clamp for applying a clamping force to the first and second disks, the clamping force being substantially centered on each spacer-to-disk contact surface.

11. The disk drive of claim 10, wherein the spacer land portions of the first and second spacer surfaces are configured to induce a local deformation in the first and second disks, respectively, under the applied clamping force.

12. The disk drive of claim 10, wherein the first and second spacer-to-disk contact surfaces are substantially flat.

13. The disk drive of claim 12 wherein the clamping force is centered on each spacer-to-disk contact surface.

* * * * *